Figure 1:
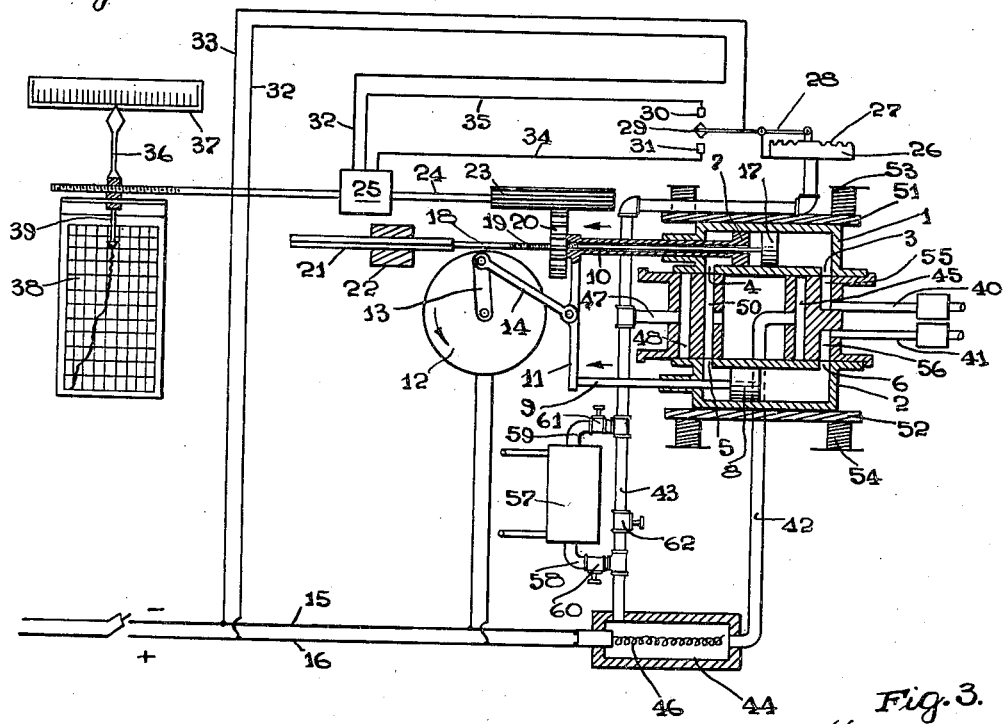

Feb. 1, 1938.  L. L. VAYDA  2,106,777

PROCESS AND APPARATUS FOR ANALYZING GAS

Filed April 26, 1934

INVENTOR
LOUIS L. VAYDA
BY James C. Bradley
ATTORNEY

Patented Feb. 1, 1938

2,106,777

UNITED STATES PATENT OFFICE 2,106,777

PROCESS AND APPARATUS FOR ANALYZING GAS

Louis L. Vayda, Aspinwall, Pa.

Application April 26, 1934, Serial No. 722,491

5 Claims. (Cl. 23—255)

The invention relates to a process and apparatus for analyzing gas. The objects of the invention are the provision of a process and apparatus, which have a very wide field of use and which permit the analysis of practically all kinds of gas for which there is an industrial requirement, such as the determination of $CO_2$, CO, $O_2$, $H_2$, $CH_4$, etc. A further object is the provision of an apparatus which is dependable and accurate; which is easily operable; and which is relatively cheap and simple in construction.

The invention involves the use of a closed system, to which a gas mixture containing a constituent (or constituents) whose percentage is to be determined, is supplied continuously. Provision is made in the system for reacting the constituent with another gas or gases, or for absorbing it, thus causing a change in the volume of the gas which is proportional to the amount of constituent. At the same time, a volume of gas is continuously evacuated from the system of such amount that the pressure in the system is maintained constant. Under these conditions, the volume of the gas supplied to the system, as compared with the gas evacuated, will give a measure or indication of the percentage of the constituent. In practice, two sets of pumping means are employed, one of which supplies the gas to the system, and the other of which evacuates it. The displacement of one of these devices may be varied so that, due to such variation, the pressure in the system may be maintained constant. The variation in displacement of the variable pumping means is automatically regulated by the pressure in the system, and an indicator registers the variation in the pump displacement, so that by a suitable calibration of the indicator, a reading may be had showing the percentage of the constituent whose reaction or absorption in the system is responsible for the variation in the pump displacement.

Figure 3:
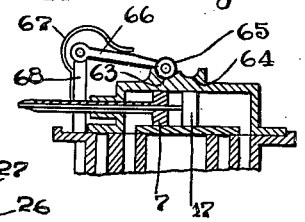
Figure 2:
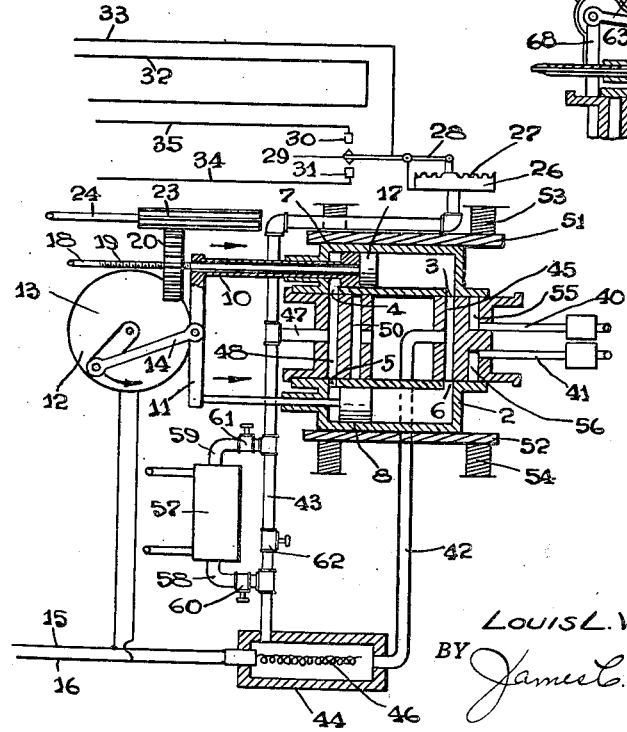

In some cases, the constituent to be removed may be merely removed by circulating the gas containing the constituent through a suitable condenser or absorbent. In other cases, the constituent may be of such character that it will react with some other element in the mixture when exposed to sufficient heat and/or by the action of a catalyzing agent; and to provide for this type of reaction, the system is supplied with a heating and/or catalyzing chamber through which the gas passes. In other cases, two gases may be supplied to the system by independent pumps, one gas containing the constituent to be determined, and the other being of a character which will react with the constituent when the mixture is passed through the heating chamber. In other cases, the steps of reaction under heat and subsequent absorption or condensation are necessary in order to secure a sufficient change in volume to give the necessary determination. The invention will be readily understood from a consideration of the detailed description following in connection with the drawing, wherein:

Figure 1 is a diagrammatic view partly in section showing the moving parts in one position. Fig. 2 is a similar view of a part of the apparatus with the moving parts in another position. And Fig. 3 shows a modification.

Referring to the drawing, 1 and 2 are a pair of cylinders mounted for reciprocation, and provided with the ports 3, 4 and 5, 6; and 7 and 8 are a pair of pistons working in the cylinders and provided with the piston rods 9 and 10 (the latter hollow) connected to the common cross head 11. This cross head is driven from an electric motor 12 through the intermediary of the crank 13 and connecting rod 14, current being supplied for operating the motor from the leads 15 and 16. Back of the piston 7 is a follower 17 which has a rod 18 extending through the hollow piston rod 10 and provided with the threaded portion 19 which is threaded through the hub of the spur gear 20. The outer end of the rod 18 has a square portion 21 slidable through a fixed block 22, so that the rod can not turn. It follows that when the gear 20 is rotated, it is adjusted longitudinally of the rod 18, thus adjusting the follower 17 toward and from the piston 7 when these parts are moving in one direction. It will be apparent that the piston 7 with the follower 17 together constitute a plunger which is adjustable as to length and displacement when these parts move in one direction, and which comes into play, as later explained, in maintaining the constant pressure in the system as heretofore referred to.

The position of the follower is adjusted by the back and forth rotation of the long pinion 23 which meshes with the gear 20 and is rotated by the shaft 24 of the split field motor 25. When the motor rotates in one direction, the gear 20 is adjusted along the rod 18 to the left, so that the space between the piston 7 and follower 17 is increased. As a result of this adjustment, the intake of the cylinder 1 at its right hand end, as the follower moves to the left, is decreased. When the motor rotates in the other direction, the gear 20 is adjusted along the rod 18 to the right, so that the space between the piston and follower is decreased. As a result of this adjustment, the intake of the cylinder at its right hand end, as the follower moves to the left, is increased. The direction of rotation of the split field motor is controlled by the pressure in the box 26 (connected to the closed system) which box has a flexible diaphragm 27 connected with the switch arm 28 having the contact 29 adapted to engage either the contact 30 or the contact 31, depending on the pressure in the closed system and box 26. If the pressure in the system rises above a certain point, such as atmospheric pressure, the contact 29 is depressed, so that it engages the contact 31, and the motor 25 rotates in one direction, due to the flow of current through the wire 33, arm 28, contact 31, wire 34, one of the motor fields and wire 32. On the other hand, if the pressure in the system drops below said point, the contact 29 is raised, so that it engages the contact 30, and the motor rotates in the reverse direction, due to the flow of current through the wire 33, arm 28, contact 30, wire 35, the other motor field coil and the wire 32.

The relative position of the piston 7 and the follower 17 is indicated by means of the pointer 36 working over the scale 37 and having its base threaded onto the extended end of the shaft 24, the pointer being suitably guided and held against a movement of rotation with the screw. This pointer is moved back and forth depending upon the direction of rotation of the motor 25, and its position is determined by the angular travel of the motor shaft, which in turn corresponds with the adjustment of the follower 17, so that, if the pressure in the system is maintained constant, the position of the pointer is a gauge of the changes in volume of gas delivered to the system in order to maintain its constant pressure. By suitable calibration, the pointer can be made to indicate the extent of the reactions occurring in the system. A recording drum 38 may be located below the pointer, and such pointer provided with a recording pen 39 for making a record of the position of the pointer throughout the period of operation.

A gas to be analyzed, such as flue or exhaust gas from the combustion of fuel, is supplied to the cylinder 1 through the pipe 40, while a second gas, such as air, is supplied to the cylinder 2 through the pipe 41. If desired, the air may be supplied through the pipe 40, and the gas to be tested through the pipe 41. The two cylinders discharge to a closed system which includes the pipes 42 and 43 and the furnace 44 through the passage 45 when the parts are in the position of Fig. 2 with the ports 3 and 6 in registration with such passage. The furnace 44 is heated from the coil 46 supplied with electric current from the leads 15 and 16. The pipe 43 is connected with the box 26 which acts as one of the elements in maintaining a constant pressure in the system as heretofore referred to. The pipe 43 is connected by means of a pipe 47 with a passage 48 which communicates at its ends with the ports 4 and 5 when the parts are in the position of Fig. 2. 50 is an exhaust passage to the atmosphere which registers with the ports 4 and 5 when the parts are in the position of Fig. 1.

The cylinders 1 and 2 are mounted for sliding movement from the extreme position, as indicated in Fig. 1, to the other extreme position, as indicated in Fig. 2, and their movement from one position to the other occurs when the plunger 7, 17 and piston 8 approach the ends of their strokes and engage the cylinder heads. In their movement to the right, the piston 7 engages the follower 17 and they move together. The cylinders are pressed yieldingly against the surfaces on which they slide by any suitable means, which in the present instance, are diagrammatically shown as plates 51 and 52 engaging the outer sides of the cylinders and pressed inward by the springs 53 and 54.

Starting with the parts in the position of Fig. 2 and the pistons moving to the right, the piston 8 and follower 17 are forcing into the pipe 42 the gases in the cylinders to the right of the pistons via the ports 3 and 6 and the passage 45. At the same time, a volume of gas is being evacuated from the pipe 47 into the cylinders to the left of the pistons via the passage 48 and the ports 4 and 5. This causes a circulation of gas through the pipe 42, furnace 44, and pipe 43 giving opportunity for a reaction to occur in the furnace resulting in a change in volume. The supply of gas to the pipe 42 and withdrawal through the pipe 47 continues until the pistons reach the right hand ends of the cylinders, where they engage the cylinder heads and move the cylinders to the position of Fig. 1. This brings the ports 3 and 6 into registration with the passages 55 and 56 respectively, with which the pipes 40 and 41 communicate, and as the pistons move to the left, the cylinders are filled with gas from the pipes. It is to be noted that the follower 17 will remain stationary until the upper part of the cross head 11 strikes the gear 20, after which the follower 17 will follow the piston 17 drawing into the cylinder a reduced volume of gas, as previously described. With the cylinders in the position of Fig. 1, the ports 4 and 5 are in registration with the exhaust passage 50, so that as the pistons move to the left, the contents of the cylinders to the left of the pistons is discharged to the atmosphere. This intake of gas into the right hand end of the cylinders, and the exhaust of the left hand ends continues until the pistons engage the heads at the left hand ends of the cylinders, when such cylinders are shifted to the left to the position of Fig. 2. The pistons 7 and 8 now start to the right, the piston 7 shortly engaging the follower 17 and bringing the parts back to the starting position of the cycle as above outlined.

In the above operation, the reaction in the furnace 44 transforms the CO in the flue gas to $CO_2$ and the hydrogen $H_2O$ as shown by the following equation:

$$2CO + O_2 = 2CO_2$$
$$2H_2 + O_2 = 2H_2O$$

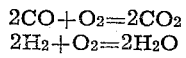

From which it is seen that three volumes of the reacting gases in either case give two volumes of gaseous products of reaction. It follows, therefore, that if the amount of gas withdrawn from the system equals that supplied thereto, a drop in pressure occurs. If now the intake relative to the outgo is adjusted, so as to maintain the pressure constant, a measure of this difference in volume taken into the system, as compared with that exhausted, will give an index of the amount of combustible which reacted in the furnace.

Assuming that, with the apparatus adjusted as shown in the drawing, with the follower 7 spaced away from the piston 7, the intake of the apparatus is equal to its outgo and that there is no reaction in the system tending to change the volume of the gas, the switch arm 28 will be in middle position and the pointer 36 will be at the zero point. If now, the reaction occurs in the system as set forth in the preceding paragraph, causing a reduction in the pressure in the system, the diaphragm 27 will move down causing the contact 29 to engage the contact 30. The motor shaft 24 is now rotated, rotating the gears 23 and 20, and moving the gear 20 along the rod 18 to the right. On the movement of the cross head and the piston 7 to the left, therefore, the follower is closer to the piston than before. The adjustment thus increases the intake capacity of the follower, but without changing the evacuating capacity of the piston 7, since on the movement of the piston and follower to the right, such parts engage, as indicated in Fig. 2. The volume of gas pumped into the system will thus be increased, and this increase will continue until the pressure built up in the system is sufficient to compensate for the loss in volume due to the reaction in the furnace 44. At such time, the diaphragm will be moved up to its original neutral position, so as to separate the contacts 29 and 30. The variation in the position of the follower will be registered by the pointer 36, since the movement produced in the shaft 18 by the motor shaft 24 is duplicated in the pointer on a larger scale. If during the analysis, the pressure increases, the diaphragm 27 is moved up, causing the contact 29 to engage the contact 31, which results in a rotation of the motor 25 in a direction the reverse of its previous movement. This causes a movement of the shaft 18 and follower 17 to the right, thus decreasing the intake capacity of the follower 17, so that the pressure in the system drops and the contact between 29 and 31 is broken, stopping the motor 25. The movement of the follower to the right as just described, is accompanied by a corresponding movement of the pointer 36 to the right. Since the change in volume of the gas in the system reflects the extent of the reaction of the gases in the furnace 44, it follows that the change in displacement in the follower 17 in order to maintain a constant pressure in the system is a correct indication of the amount of the constituent in the gas subject to the reaction.

In the operation, as above described, it is necessary in order to get accurate results, to maintain the cylinders, connecting passages and tubing at a temperature high enough to prevent condensation of the water vapor formed by the reacting gases. This can easily be accomplished by placing the apparatus in a heated cabinet (not shown) or by submerging it in a heated liquid, such as oil, which latter expedient has the further advantage of lubricating the moving parts.

A further application of the apparatus is in the determination of the percentage of oxygen in the flue and furnace gases from boiler furnaces, industrial heating and annealing furnaces, open hearth furnaces, kilns, etc. In using the apparatus, the cylinder 1 is connected so as to draw in the gas to be analyzed, while the cylinder 2 is connected to draw in a gas which will unite with the oxygen, such as hydrogen. The reaction in the furnace is indicated by the following equation:

$$O_2 + 2H_2 = 2H_2O$$

From which it is seen that three volumes of the reacting gases give two volumes of the gaseous products of the reaction, resulting in a change of pressure in the system, as heretofore described. The use of the apparatus also requires a maintenance of the temperature of the apparatus above a given point to prevent condensation, and suitable means may be employed for the purpose, as above described.

To determine the percentage of absorbable constituent, or constituents, in a gas mixture, such as for instance, the percentage of $CO_2$ in furnace and flue gases from boiler furnaces, etc. as well as in exhaust gases from internal combustion engines, the furnace 44 need not be employed, and an absorbing unit, as indicated at 57, is used, such unit being supplied with potassium hydroxide which will remove the carbon dioxide. This unit is connected to the pipe 43 by the pipes 58 and 59 carrying the valves 60 and 61. In using the unit, the valves 60 and 61 are opened and the valve 62 is closed, so that the gases to be acted upon are circulated through the casing 57. The coil 46 in the furnace 44, during this operation, is not heated. Under these conditions, the $CO_2$ in the gas is completely absorbed in the unit 57, thus reducing the pressure in the system, and causing a shift in the position of the follower 17 so that its lag with respect to the piston 7 is reduced with a corresponding movement of the pointer 36. In this case, the scale 37 and chart 38 are calibrated directly in terms of percentage of the absorbable constituent or constituents, by volume in the original gas. In this and similar cases in which the same gas is admitted through both pipes 40 and 41, the cylinder 1 would be used for the gas, and the use of the cylinder 2 and piston 8 is, of course, superfluous as they merely add to the volume of the gas tested, the device being calibrated to meet this condition.

The apparatus may further be used to determine the percentage of carbon monoxide and/or hydrogen in air, such as may exist in vehicular tunnels, garages, or other confined spaces subject to pollution by the exhaust gases from automotive vehicles. In this case, as in the preceding one, the air to be tested is drawn into the system through both pipes 40 and 41, the oxygen in the mixture being sufficient to give the necessary reaction in the furnace 44. The reaction is indicated by the following equations:

$$2CO + O_2 = 2CO_2$$

$$2H_2 + O_2 = 2H_2O$$

It will be seen that three volumes of the reacting gases in either case give two volumes of gaseous products of reaction. But since the percentage by volume of carbon monoxide and/or hydrogen in the air tested, will in most cases be small, the volume change due to the reaction will be correspondingly small, perhaps too small for practical measurement of the resulting change in intake displacement and stroke of the follower 17. It is, therefore, desirable to increase the difference in volume, and this is accomplished by the use of the unit 57 heretofore described. The unit may be equipped to remove the carbon dioxide formed, as by the use of potassium hydroxide, and/or for the removal of the water vapor by the use of calcium chloride. As before, the unit 57 is brought into use by opening the valves 60 and 61, and closing the valve 62. The volume of the reacting gases may, in this way, be removed from the system and the resulting change in volume is correspondingly increased.

The apparatus may be similarly employed to determine the percentage of inflammable gas or vapors in air, such as for example, the percentage of methane in air which has been used for ventilation of a mine. As in the preceding examples, as gas to be tested is drawn into the system through pipes 40 and 41, and the unit 57 is utilized. In this case, the reaction is indicated by the following equation:

$$CH_4 + 2O_2 = CO_2 + 2H_2O$$

It will be seen that three volumes of the reacting gases gives three volumes of the gaseous products of the reaction. There is thus no change in volume. The necessary change in volume is secured by passing the gases through the unit 57, which as before, is equipped to chemically remove the carbon dioxide by the use of potassium hydroxide, and the water vapor by the use of calcium chloride. The volume of the reacting gases may thus be removed, and the resulting variation in volume in the system measured.

Fig. 3 illustrates a modified means for holding the cylinders against their seats and maintaining them yieldingly in the extremes of movement until positively moved by the pistons. The cylinder is provided on its upper side with two recesses 63 and 64 adapted to be engaged by the roller 65 on the arm 66 yieldingly pressed down by the spring 67, the arm 66 being pivoted to the fixed bracket 68. The cylinder is held in the position shown until the piston 7, which is moving to the left, engages the end of the cylinder and moves it to the left. The roller 65 resists this movement, but is cammed upward and then moves down and engages the recess 64 holding the cylinder in its new position until the reverse movement of the piston 7 shifts the cylinder back to the position shown.

It will be understood that the apparatus is illustrated in a very simple form, and is capable of wide modification and elaboration. Various other forms of pumps may be employed for carrying out the process. The reaction of the gases is preferably accomplished by the application of heat, as supplied by the furnace 44, but other means may be employed for promoting the reaction, including a catalyzing agent with or without heat, such as palladium sponge or certain metallic oxides well known in the art. While the electric switch means operated by pressure and including the motor 25 are preferably used for maintaining the constant pressure in the system, the invention is not limited to the use of this particular device, as mechanically operated means might be substituted. As shown and described, the pressure in the system is maintained constant by varying the intake, but it will be understood that this result may equally well be accomplished by varying the amount of gas exhausted, and that the claims are, with respect to this feature, to be construed broadly in accordance with their terms.

What I claim is:

1. Apparatus for analyzing a gas comprising a closed testing system, a collateral sampling system, means for pumping into the testing system a gas mixture containing a constituent whose percentage it is desired to determine, means in the testing system for treating the mixture so that its volume is modified to an extent dependent upon the amount of said constituent, means for evacuating from the testing system a volume of the treated gas, said means for delivering the gas and evacuating it comprising the sampling system including a cylinder, a piston working therein, a follower for the piston which in the movement of the piston in one direction engages such piston and in the movement of the piston in the other direction is held spaced away therefrom, a port at one end of the cylinder for receiving the gas to be analyzed as the piston and follower move away from the port, connections whereby such gas is forced into the testing system on the reverse movement of the piston, a port at the other end of the cylinder for receiving the gas to be evacuated from the testing system as the piston and follower move away from such last port, connections whereby such last mentioned gas is forced from the sampling system into the atmosphere on the reverse movement of the piston, and means for indicating the degree of separation of the piston and its follower.

2. Apparatus for analyzing a gas comprising a closed testing system, a collateral sampling system, means for pumping into the testing system a gas mixture containing a constituent whose percentage it is desired to determine, means in the testing system for treating the mixture so that its volume is modified to an extent dependent upon the amount of said constituent, means for evacuating from the testing system a volume of the treated gas, said means for delivering the gas and evacuating it comprising the sampling system including a cylinder, a piston working therein, a follower for the piston which in the movement of the piston in one direction engages such piston and in the movement of the piston in the other direction is held spaced away therefrom, a port at one end of the cylinder for receiving the gas to be analyzed as the piston and follower move away from the port, connections whereby such gas is forced into the testing system on the reverse movement of the piston, a port at the other end of the cylinder for receiving the gas to be evacuated from the testing system as the piston and follower move away from such last port, connections whereby such last mentioned gas is forced from the sampling system into the atmosphere on the reverse movement of the piston, means governed by the pressure in the testing system for regulating a degree of separation to the piston and its follower, and means for indicating the degree of separation of the piston and its follower.

3. A method of analyzing gas, which consists in pumping separately into a sampling system a gas mixture containing a constituent, the percentage of which it is desired to determine, and a fixed proportion of some other gas which will react with the constituent in a definite manner so that the volume of the gaseous products of the reaction is different from the initial volume of the reacting gases, pumping said mixture into a closed testing system, causing said reaction to occur, pumping from the sampling system, coincident with the supply of gas thereto, a quantity of the gaseous products of the reaction, varying the relative volumes of gas delivered into and removed from the testing system so that the pressure in the testing system is maintained constant, and during the pumping of gas into and out of the sampling system, measuring the difference between the volume of gas delivered to the testing system and that withdrawn therefrom to give a determination of said constituent.

4. Apparatus for analyzing gas containing a constituent whose percentage it is desired to determine, comprising a closed testing system, a collateral sampling system, means for pumping into and at the same time pumping from the sampling system a gas mixture, means in the closed testing system for treating the mixture so that its volume is modified dependent upon the amount of said constituent, said means for delivering the gas and exhausting it comprising a cylinder provided with a driven plunger and a driven follower, one end of the cylinder receiving the gas to be supplied to the sampling system as the plunger and follower move in one direction and supplying it to the testing system on the reverse stroke, and the other end of the cylinder receiving the gas from the testing system as the plunger and follower move in one direction and discharging it to the atmosphere on the reverse stroke, said plunger having a constant displacement and the follower being adjustable as to displacement and means for indicating the variable displacement of the follower during the pumping operation.

5. Apparatus for analyzing gas containing a constituent whose percentage it is desired to determine, comprising a closed testing system, a collateral sampling system, means for pumping into and at the same time pumping from the sampling system a gas mixture, means in the closed testing system for treating the mixture so that its volume is modified depending upon the amount of said constituent, said means for delivering the gas and exhausting it comprising a cylinder provided with a driven plunger and a driven follower, one end of the cylinder receiving the gas to be supplied to the sampling system as the plunger and follower move in one direction and supplying it to the testing system on the reverse stroke, and the other end of the cylinder receiving the gas from the testing system as the plunger and follower move in one direction and discharging it to the atmosphere on the reverse stroke, said plunger having a constant displacement and the follower being adjustable as to displacement, means governed by the pressure in the testing system for regulating the displacement of the follower so that such pressure is maintained constant and means for indicating the variable displacement of the follower during the pumping operation.

LOUIS L. VAYDA.